United States Patent [19]

Anderson

[11] Patent Number: 4,820,148

[45] Date of Patent: Apr. 11, 1989

[54] WINDSHIELD REPAIR DEVICE

[76] Inventor: Douglas B. Anderson, P.O. Box 555, Rigby, Id. 83442

[21] Appl. No.: 70,324

[22] Filed: Jul. 6, 1987

[51] Int. Cl.[4] .......................... B32B 35/00; B29F 5/00
[52] U.S. Cl. .................................. 425/12; 29/402.18; 156/382; 425/13
[58] Field of Search ............. 29/402.01, 402.18, 527.1, 29/527.2; 156/94, 103, 293, 382, 330; 264/36, 102; 425/13, 12, 11, 405.1; 427/140; 428/63

[56] References Cited

U.S. PATENT DOCUMENTS

| | | | |
|---|---|---|---|
| 4,032,272 | 6/1977 | Miller | 425/13 X |
| 4,047,863 | 9/1977 | McCluskey et al. | 156/94 X |
| 4,280,861 | 7/1981 | Schwartz | 156/94 X |
| 4,419,305 | 12/1987 | Matles | 156/94 X |

*Primary Examiner*—Timothy V. Eley

*Attorney, Agent, or Firm*—Hopkins, French, Crockett, Springer & Hoopes

[57] ABSTRACT

A windshield repair device for repairing imperfections, in the form of bull's eyes, chips or cracks, induced by road hazards. The device comprises a first vacuum device for repairing relatively large imperfections, a second vacuum device for repairing relatively small imperfections adjacent the windshield periphery, and a platen to secure the second vacuum device to the windshield. The first vacuum device evacuates a relatively large area over a chip or crack and injects ultra-violet light-settable polymer resins into the evacuated imperfection. The second vacuum device is essentially the inner portion of the first vacuum device and is capable of evacuating a much smaller area. The second vacuum device is primarily useful either at the periphery of the windshield, or on areas of windshields having a high degree of curvature. The platen assists in holding the second vacuum device to the windshield.

8 Claims, 3 Drawing Sheets

WINDSHIELD REPAIR DEVICE

BACKGROUND OF THE INVENTION

When struck by flying debris, such as rocks or gravel, automobile and truck windshields often develop "stars" or "bull's-eyes". If not treated relatively rapidly, these rather small entities an develop cracks radiating outwardly therefrom across the entire width or height of the windshield. Whether or not the structural integrity of the windshield is adversely affected by a long crack, it is both unsightly and a driving hazard, inasmuch as it can distract the vehicle driver if it is in his or her line of sight. Therefore, it is recommended that such stars or bull's-eyes be repaired as quickly as possible, prior to the formation of cracks.

Various methods have been proposed for fixing such imperfections, and a number of "systems" are currently available for purchase. For example, the "Glass Medic" TM system uses a motorized electric vacuum pump to evacuate the immediate area around the bull's-eye. Polymer resin is injected into the bull's-eye after air has been evacuated therefrom, the resin being thereafter cured with ultraviolet light. This system provides adequate repair opportunities, but there are a number of inherent limitations incident to its use. For instance, it is relatively difficult to draw a vacuum and maintain the vacuum with the unit affixed to the windshield, hence the need to utilize an electric vacuum pump to provide continuous suction. Also, the device is not readily portable, as it needs an electric source and weighs approximately 50 pounds, and due to the size of the unit affixed to the windshield, it cannot be used to repair imperfections along the periphery of the windshield, since a vacuum cannot be drawn over the top of the windshield trim.

The prior art windshield repair systems have recognized that optimal repair of small imperfections in windshields is effected under a vacuum. If the area immediately surrounding the imperfection is evacuated, when the polymer resin is injected into the bull's-eye or crack, the entire volume of the imperfection can be filled with resin, as opposed to having an air bubble remain therein. The presence of air bubbles obviously prevents uniform resin penetration, and reduces the effectiveness of the repair procedure.

Therefore, there is a need for a windshield repair apparatus which is not only effective, but is highly portable, both in terms of weight and potential freedom from electric power, and which is capable of serving its function in areas of the windshield immediately adjacent the periphery thereof.

SUMMARY OF THE INVENTION

The present invention comprises a windshield repair device which repairs imperfections, in the form of stars, bull's-eyes or cracks, in glass windshields. In a preferred embodiment, the invention comprises first and second vacuum devices which may be affixed to a platen. The first vacuum device comprises an outer housing, an inner housing within the outer housing, gaskets on both of the housings to seal larger and smaller evacuated areas from air intrusion, a plunger slideably retained within a plunger housing which is disposed within the inner housing, and a vacuum source adapted to draw a vacuum in both the larger and smaller evacuated areas. The inner housing is provided with an aperture which permits the annulus between the inner and outer housings (the larger evacuated area) to be evacuated. The plunger housing is likewise provided with an aperture which provides the area immediately therebelow (the smaller evacuated area) to be evacuated. Windshield repair fluid, in the form of ultra-violet-settable resins are injected into the plunger housing and the plunger inserted therein. As a vacuum is drawn through the larger and smaller evacuated areas, air leaves the cracks therebelow, and resin is drawn therein.

The second vacuum device is provided so that imperfections located immediately adjacent the windshield periphery, which are not susceptible to repair by the first vacuum device can be repaired. The second vacuum device comprises the inner housing, the plunger housing and the plunger of the first vacuum device, and evacuates only a smaller area immediately beneath the plunger housing. The second vacuum device is held in place on a windshield by inserting both the first and second vacuum devices into the platen, and inducing a vacuum in the first vacuum device to hold the second vacuum device securely against the windshield.

DETAILED DESCRIPTION OF THE INVENTION

Figure 1:
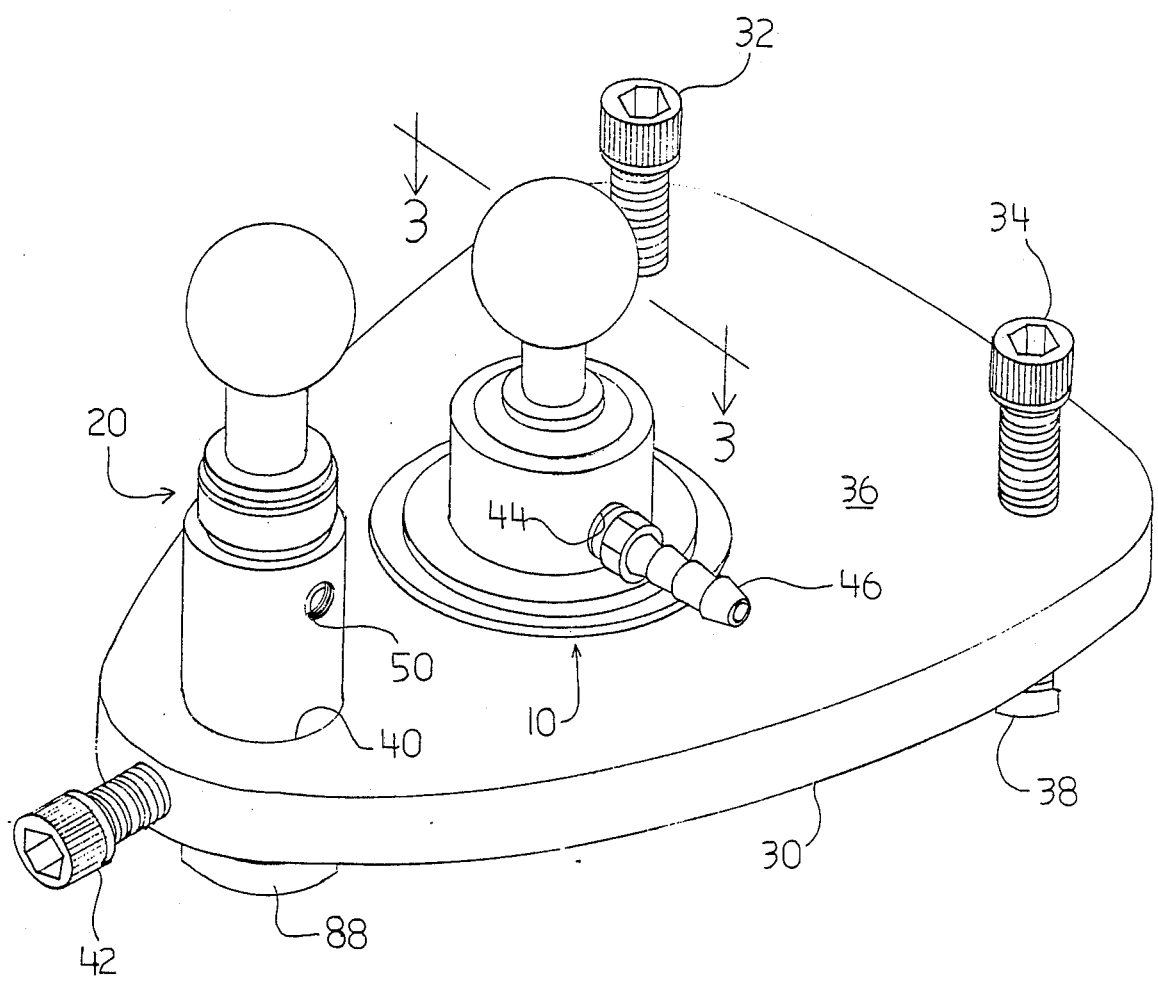
FIG. 1 is a perspective view of the invention comprising first and second vacuum devices, and a platen.

A windshield repair device of the present invention is shown in FIG. 1. As shown therein, a first vacuum device, indicated generally at 10, and a second vacuum device, indicated generally at 20, are both affixed to a platen, generally indicated at 30. As illustrated, the device has a 3-point suspension system, comprised of a pair of adjustable legs 32, 34 and a gasket 88 at the lower portion of second vacuum device 20. The adjustable legs are threaded through the surface 36 of platen 30 and are provided with caps 38 on the lower ends thereof. The second vacuum device 20 is slideably retained within the platen 30 through aperture 40 and secured by bolt 42.

The first vacuum device 10 is provided with an aperture 44 into which is screwed a male hose fitting 46 a hose (not shown) is secured about the male hose fitting 46 and affixed to a vacuum source (not shown). The second vacuum device 20 is likewise provided with an aperture 50 into which a male hose fitting, hose and vacuum source can be affixed.

Figure 2:
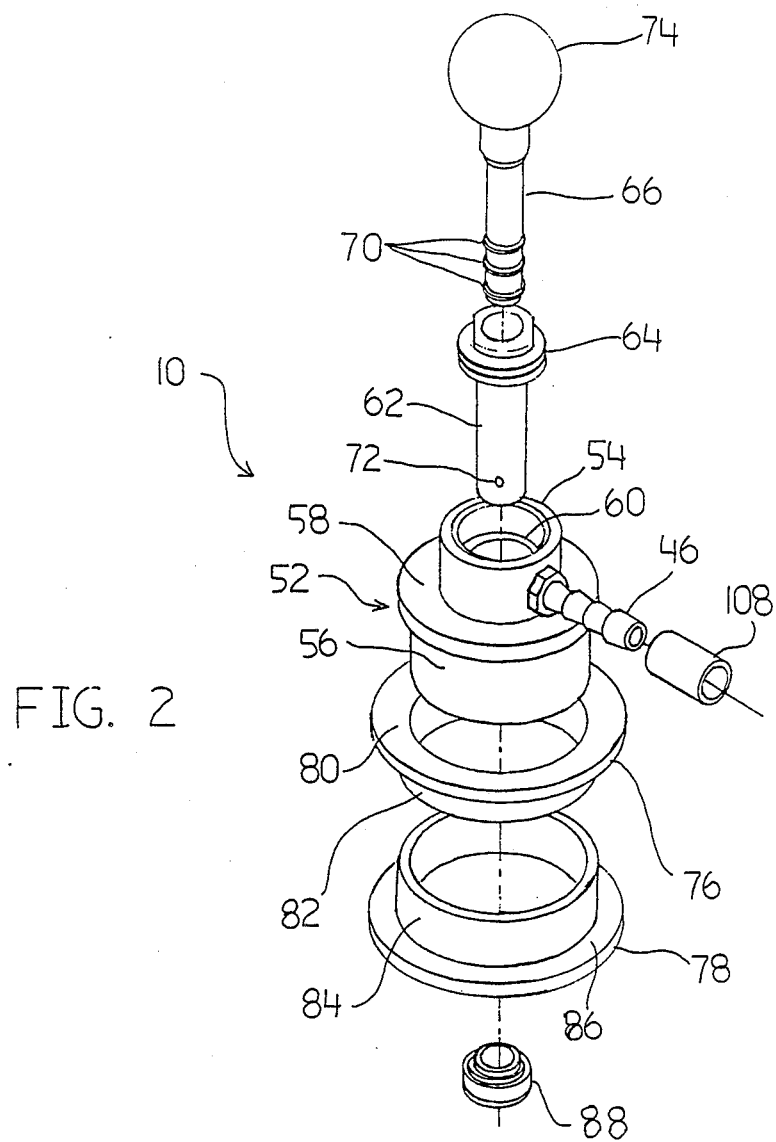
FIG. 2 is an exploded perspective view of the first vacuum device of the present invention.

Turning now to FIG. 2, the first vacuum device 10 comprises an outer housing 52 which is comprised of an upper portion 54 and a lower portion 56, inner-connected by flange 58. While the device has been represented in a tubular fashion having a circular cross section, it is to be understood that various other cross-sectional configurations would work equally well. As shown in FIG. 2, the upper portion 54 is of a smaller diameter than lower portion 56, with the portions being contiguous through flange 58. Concentrically within the outer housing 52 there is an inner housing 60 which is securely affixed to the inner surface of upper portion 54 and flange 58.

Plunger housing 62 is disposed within the inner housing 60 and secured within upper portion 54 of outer housing 52 by means of gasket 64. Plunger 66 is adapted to be slideably retained within plunger housing 62. Sealing engagement is effected between the plunger 66 and plunger housing 62 by one or more gaskets 70. The plunger housing 62 is provided with an aperture 72 located above at least one of the gaskets 70. A handle 74 is provided on the upper end of plunger 66 in any convenient form for grasping.

The lower portion 56 of outer housing 52 is provided with a pair of gaskets 76, 78. The upper gasket 76 comprises flange 80 which abuts flange 58. The tubular portion 82 of gasket 76 fits securely about lower portion 56. The lower gasket 78 comprises tubular portion 84 which fits securely about lower portion 56 and abuts against the tubular portion 82 of gasket 76. Gasket 78 is likewise provided with flange 86, the lower surface of which rests against the windshield to be repaired. The plunger housing 62 is maintained within inner housing 60 by means of gasket 88.

Figure 3:
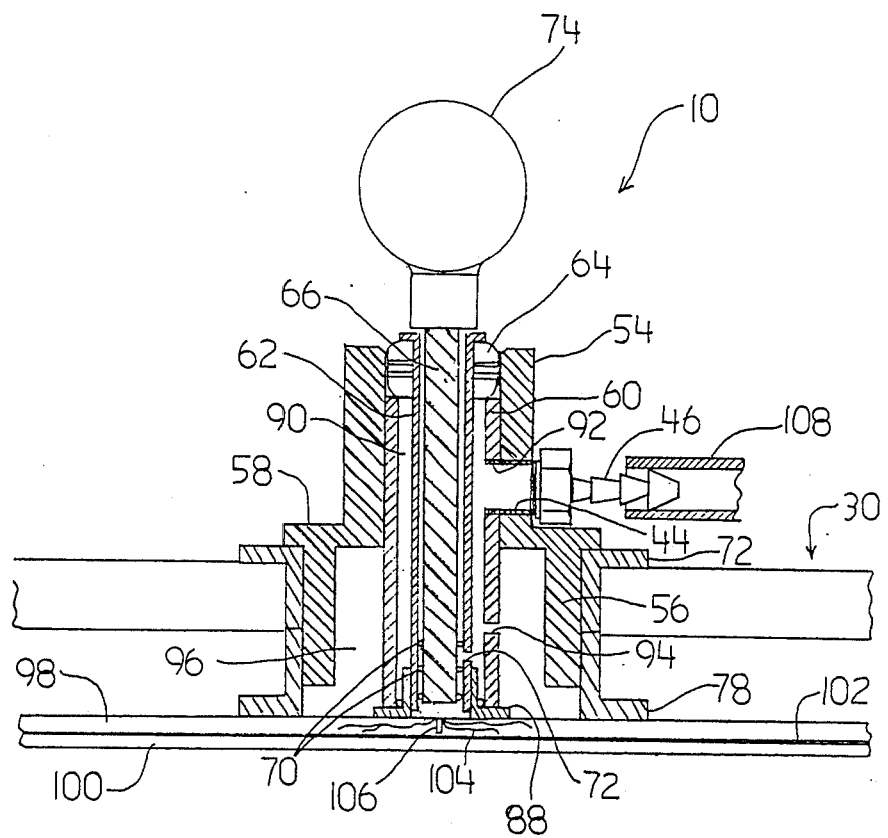
FIG. 3 is a longitudinal sectional view of the first vacuum device taken along lines 3—3 of FIG. 1.

While not shown in FIG. 2 or 3, the platen 30 is disposed between the flanges 80, 86 of gasket 76, 78. An aperture in the platen is sized to permit the tubular portion 82 of gasket 76 to fit therein.

FIG. 3 is a longitudinal sectional view of a preferred embodiment of the present invention in its assembled form. As can be seen, the upper and lower portions 54, 56 of outer housing 52 are contiguous and innerconnected by flange 58. The inner housing 60 is secured (as with glue) to a portion of upper portion 54 and extends into the interior of lower portion 56. The plunger housing 62 is concentric with inner housing 60 and a gap 90 therebetween is maintained by gasket 88. The lowermost edge portion of plunger housing 62 is adapted to terminate slightly above the windshield surface, leaving a gap of about 1/16th". The inner housing is provided with an aperture 92 coincident with aperture 44 of upper portion 54 into which the male hose fitting 46 is secured. Inner housing 60 is provided with a second aperture 94 which permits communication between gap 90 and annulus 96, which is defined by lower portion 56 and inner housing 60. With the plunger 66 partially withdrawn within plunger housing 62, such that the gaskets 70 are located above the aperture 72, the interior of plunger housing 62 (and therefore the imperfection in the windshield) communicates with the vacuum source.

As can be seen in FIG. 3, the first vacuum device 10 is retained within platen 30 such that the lower most edge portion of gaskets 78, 88 bear against the automobile windshield to be repaired. As illustrated, the windshield comprises a pair of glass sheets 98, 100 separated by plastic lamination 102. An imperfection, in the form of a star, crack, bull's-eye, or other discontinuity comprises a number of cracks 104 radiating outwardly from a center point.

OPERATION OF THE INVENTION

The benefits of the present invention will be readily apparent to those skilled in the art upon review of the following description of the operation of the present invention.

Cracks in automobile and/or truck windshields typically radiate outwardly from a bull's-eye star, etc. (hereinafter termed a "chip") the initial imperfection resulting from a stone or other debris striking the windshield of a moving automobile. If the imperfection is fixed relatively rapidly, long cracks rarely develop therefrom. In fixing such chips, it is common practice to drill a relatively small hole 106 into the center of the chip 104 (FIG. 3). As the cracks of the chip rarely extend through the plastic laminate 102 and into the second (or inner) glass sheet 100, the hole should likewise not penetrate into the second glass sheet 100. This hole 106 may typically be from about 1/16" to about 3/32" in diameter. After the hole has been drilled into the chip, either the first or second vacuum device may be placed over the hole, depending upon its size and location. As a general rule, applicant has found it preferable to use the first vacuum device 10 for repair of all chips except those along the periphery of the windshield. Because the area which can be evacuated with the first vacuum device is considerably greater than that with the second vacuum device, repairs are effected much quicker, and without need for platen 30. However, if the chip is located closer than about 1¼ inches from the windshield trim, the second vacuum device 20 may be used.

The present invention is intended primarily for use with chips or cracks having a diameter or length of 2 inches or less. If the imperfection has a diameter of greater than 2 inches, multiple operations must be performed sequentially. For instance, when fixing a chip having a star crack with a 3 inch crack radiating outwardly therefrom, approximately 1–1½ inches of the outermost extremity of the crack may be taped (as with any transparent tape) in order to prevent air movement into the crack, and thereafter into the star crack. However, taping of cracks is an optional procedure that is typically unnecessary. A crack can usually be repaired by moving the first vacuum device 10 laterally along the crack until fully sealed with resin. It is not recommended that cracks longer than about 6" be repaired.

The first vacuum device may be affixed to the windshield either with or without use of the platen 30. The angle of the platen and the second vacuum device relative to the windshield may be adjusted by adjusting the settings of adjustable legs 32, 34. Because the surface area drawing a vacuum is so small when using only the second vacuum device 20, the platen 30 is used in conjunction with the first vacuum device 10, to secure the second vacuum device to the windshield. In this embodiment, the first vacuum device 10 is functioning solely to secure the second vacuum device 20 to the windshield. Once a vacuum has been drawn through the first vacuum device 10, and it is securely affixed to the windshield, adjusting the legs, 32, 34 upwardly or downwardly can assist in achieving the proper alignment of the second vacuum device 20 relative to the windshield. If the platen is not used (the imperfection being more than 1¼" from the windshield trim), the device 10 is merely placed over the imperfection to be repaired. In either case, the outlet of the plunger housing 62 is centered directly over the drill hole 106, with the gaskets 78 and 88 flush against the windshield surface. The aperture 72 in plunger housing 62 is positioned in its upper-most orientation. As most windshields are canted at some angle from horizontal (such as about 45°) the plunger housing will be at a right angle thereto and aperture 72 is advantageously placed on the upper side of the plunger housing.

Commercially available ultra-violet-settable resin (such as resins sold by the Glass Masters Company) are injected into the bottom of plunger housing adjacent the windshield and the plunger 66 is inserted partially therein. Typically, about ¼ cc of resin is injected, a quantity which is not sufficient to "overflow" through aperture 72. The plunger is inserted into the plunger housing only to a point above the aperture 72.

A vacuum pump is then affixed to the tubing 108 and then onto the male hose fitting 46. Any conventional vacuum pump will suffice, but applicants have found it advantageous to use a simple hand-operated vacuum pump due to its inexpensive cost, ease of operation, freedom from electrical power, etc. A vacuum of at least 5-10 inches of mercury is drawn, and optimally at least 20 inches of mercury. At this point, air will be drawn from the chip and associated cracks through either or both of two pathways. Immediately below the plunger housing, air will be drawn into the plunger housing, through the resin and then upwardly to exit from the plunger housing through aperture 72 and into the gap 90 between plunger housing and inner housing 60. This air will exit the inner housing through aperture 92 and tubing 108. Cracks extending beyond the diameter of the plunger housing, underlying the annulus 96, may release their air through the plunger housing, or alternatively into annulus 96. Because aperture 94 places annulus 96 in fluid communication with the vacuum source, air may be drawn from the cracks into annulus 96, and thereafter through the aperture 94 into gap 90. Thereafter, this air exits through aperture 92 and tubing 108.

As soon as no more bubbles are observed passing through the resin (in applicant's experience this is a period of approximately 5 minutes), the resin can be injected into the chip and cracks. By depressing the plunger to the bottom of the plunger housing, resin will be forced into the cracks which have been evacuated of air. Applicant has found that it is advantageous to provide a plunger having a length, when fully depressed within the plunger housing slightly less than the plunger housing. For instance, if the plunger is about 1/16th inch shorter than the plunger housing, the resin will be forced into the cracks and the plunger will not contact the windshield.

When the plunger is fully depressed within the plunger housing, at least one of the gaskets 70 is "below" the aperture 72, thereby sealing off the plunger housing. While sitting on the inside of the vehicle, the operator may observe the resin being drawn into the cracks in the windshield. If it is apparent that the resin is not being fully distributed throughout the crack, it may be because air still remains in the crack. Therefore, the plunger may be pulled upwardly, so that gaskets 70 are above the aperture 72, and the vacuum source activated to again begin evacuating the crack. As the air is pulled from the crack, one may observe the resin moving into the area being evacuated. Applicant has observed that it frequently takes at least 1, and possibly 2 vacuum cycles to completely fill many cracks with resin. After the imperfection is filled with resin, the vacuum device may be removed from the windshield by releasing the vacuum, and a piece of, for instance, Mylar applied to the resin-coated area to prevent the resin from flowing down the windshield. At that point, an ultra-violet light source is positioned over the still-fluid resin, and left for about 5 minutes, at which time the resin will be hardened in place. After the Mylar is peeled from the hardened resin, excess resin on the outside of the windshield can be milled off with, for instance, a razor blade.

The foregoing description relates to use of the first vacuum device 10, as shown more clearly in FIGS. 2 and 3. If, however, the imperfection is immediately adjacent the windshield trim, the relatively large diameter of sealing gasket 78 of first vacuum device 10, may not permit the device to be positioned close enough to the windshield trim to effect the repair. Therefore, the second vacuum device 20, as shown in FIG. 1, is provided for the repair of such imperfections. The second vacuum device is functionally the same apparatus as the first vacuum device, except that the outer housing 52 and gaskets 76, 78 are not present. Therefore, the second vacuum device is capable of evacuating a relatively small imperfection solely through the plunger housing 62. Of course, the second aperture 94 is not present on the inner housing (which in this embodiment is now, in effect, the "outer housing", as it would prevent a vacuum being drawn within the plunger housing. The male hose fitting 46 is affixed to the inner housing 60 directly, as opposed to be being affixed to the upper portion 54 of outer housing 52. Because the area evacuated by the plunger housing is relatively small, it is difficult to induce the second vacuum device to "stick" to the windshield during the repair operation. Therefore, the second vacuum device is typically used in association with the platen 30 and the first vacuum device. For instance, with the apparatus assembled as shown in FIG. 1, the second vacuum device is positioned over the imperfection at the periphery of the windshield, and the first vacuum device is operated in order to cause the first vacuum device to be securely affixed to the windshield. The second vacuum device is thereafter evacuated by the vacuum source. In this embodiment, the first vacuum device acts merely as an anchor to securely affix the second vacuum device and the platen to the windshield. If, for instance, greater pressure is desired between the second vacuum device and the windshield, the adjustable legs 32, 34 can be rotated so as to raise the end of the platen opposite the second vacuum device, thereby forcing the second vacuum device downwardly against the windshield.

Applicant has found that portions of some windshields have a degree of curvature severe enough that the size of the gasket 78 prevents the first vacuum device from effectively holding a vacuum over this curved area. Therefore, if an imperfection develops adjacent the arc of such windshields, it is necessary to utilize the second vacuum device to effect the repair.

Thus, while the invention has been described with particular reference to the specific embodiment set forth above, it will be understood that the invention may be embodied in forms diverse from those specifically shown and described, without departing from the sphere and scope of the invention as defined by the appended claims.

I claim:
1. A windshield repair deice for repairing imperfections in glass windshields, comprising:
   a. a first vacuum device comprising:
      1. an outer housing having a lower edge portion defining a larger evacuated area, said housing having an aperture therethrough;
      2. an inner housing within said outer housing and having a lower edge portion defining a smaller evacuated area, said inner housing having an aperture therethrough;
      3. a first gasket adapted to seal said larger evacuated area from intrusion of air so as to form a vacuum therein;

4. a second gasket adapted to seal said smaller evacuated area from intrusion of air and produce a vacuum therein;
5. a plunger housing confined within said inner housing;
6. a plunger adapted to direct windshield repair fluid through said plunger housing such that said fluid is in contact with the imperfection in a glass windshield;
7. a vacuum source affixed to the aperture in said outer housing such that a vacuum is simultaneously drawn in the larger and smaller evacuated areas;

b. a second vacuum device for repairing small imperfections about the periphery of a glass windshield, comprising:
1. an outer housing having an aperture therethrough for affixation to said vacuum source;
2. a plunger housing within the outer housing and having an aperture therethrough;
3. a plunger adapted to direct windshield repair fluid through said plunger housing to said windshield;
4. gasket means affixed to the lower edge of the outer housing and the plunger housing, such that the plunger housing defines an evacuated area adjacent the imperfection in the windshield;

c. platen means to which said first and second vacuum devices can be attached, thereby insuring proper sealing engagement between said devices and said windshield.

2. The device as recited in claim 1, wherein each of said gaskets is adapted to lie flush against the plane of the windshield.

3. The device as recited in claim 1, wherein windshield repair fluid is directed through the plunger housing adjacent the windshield imperfection, such that when the vacuum source is operated, air is withdrawn from the imperfection and windshield repair fluid enters therein.

4. The device as recited in claim 3, wherein said vacuum source comprises a hand-operable vacuum pump.

5. A windshield repair apparatus for repair of imperfections in a glass windshield, comprising:
a first device having
an outer housing having a lower edge portion defining a larger evacuated area, said housing having an aperture therethrough,
an inner housing within said outer housing and having a lower edge portion defining a smaller evacuated area, said inner housing having an aperture therethrough,
a first gasket adapted to seal said larger evacuated area from intrusion of air so as to form a vacuum therein,
a second gasket adapted to seal said smaller evacuated area form intrusion of air and produce a vacuum therein,
a plunger housing confined within said inner housing,
a plunger adapted to direct windshield repair fluid through said plunger housing such that it is in contact with the imperfection in a glass windshield,
a vacuum source affixed to the aperture in said outer housing such that a vacuum is simultaneously drawn in the larger and smaller evacuated areas;
a second device for repairing small windshield imperfections on a periphery of the windshield, having
an outer housing having an aperture therethrough for affixation to said vacuum source,
a plunger housing having an aperture therethrough,
a plunger adapted to direct windshield repair fluid through said plunger housing to said windshield,
gasket means affixed to the lower edge of the outer housing and the plunger housing, such that the plunger housing defines an evacuated area adjacent the imperfection in the windshield; and
platen means to which the first and second devices can be removably affixed to insure proper sealing engagement between the apparatus and the windshield.

6. The device as recited in claim 5, wherein the platen is provided with adjustable feet to adjust the angle between the device and the windshield.

7. The apparatus as recited in claim 5, wherein when said vacuum source is operated, air is withdrawn from the imperfection and windshield repair fluid is injected therein 8. A windshield repair apparatus for repair of imperfections in a glass windshield, comprising:
a first device having
an outer housing having a lower edge portion defining a larger evacuated area, said housing having an aperture therethrough,
an inner housing within said outer housing and having a lower edge portion defining a smaller evacuated area, said inner housing having an aperture therethrough,
a first gasket adapted to seal said larger evacuated area from intrusion of air so as to form a vacuum therein,
a second gasket adapted to seal said smaller evacuated area from intrusion of air and produce a vacuum therein,
a plunger housing confined within said inner housing,
a plunger adapted to direct windshield repair fluid through said plunger housing such that it is in contact with the imperfection in a glass windshield,
a vacuum source affixed to the aperture in said outer housing such that a vacuum is simultaneously drawn in the larger and smaller evacuated areas,
said plunger housing having an aperture therethrough such that the plunger housing is in fluid communication with said vacuum source, thereby permitting a vacuum to be drawn in said plunger housing;
a second device for repairing small windshield imperfections on a periphery of the windshield, having
an outer housing having an aperture therethrough for affixation to said vacuum source,
a plunger housing having an aperture therethrough,
a plunger adapted to direct windshield repair fluid through said plunger housing to said windshield,
gasket means affixed to the lower edge of the outer housing and the plunger housing, such that the plunger housing defines an evacuated area adjacent the imperfection in the windshield; and
platen means to which the first and second devices can be removably affixed to insure proper sealing engagement between the apparatus and the windshield.

\* \* \* \* \*